(12) United States Patent
Marino

(10) Patent No.: US 7,722,059 B1
(45) Date of Patent: May 25, 2010

(54) COMPLETE WHEEL BRACKET ASSEMBLY FOR A MODULAR BASE ASSEMBLY FOR VEHICLE MODEL MAKING

(76) Inventor: Paul W. Marino, 21300 MacArthur Blvd., Warren, MI (US) 48089

( * ) Notice: Subject to any disclaimer, the term of this patent is extended or adjusted under 35 U.S.C. 154(b) by 49 days.

(21) Appl. No.: 12/237,492

(22) Filed: Sep. 25, 2008

Related U.S. Application Data

(60) Provisional application No. 60/976,160, filed on Sep. 28, 2007.

(51) Int. Cl.
*B60G 25/00* (2006.01)
(52) U.S. Cl. .............................. 280/86.75; 301/111.01; 248/297.21
(58) Field of Classification Search ............ 301/111.01, 301/111.03, 111.04, 111.05, 111.06; 280/80.1, 280/86.75; 248/223.21, 297.21; 446/465, 446/470, 471; 269/2, 48.1, 48.2, 87.2
See application file for complete search history.

(56) References Cited

U.S. PATENT DOCUMENTS

| | | | | |
|---|---|---|---|---|
| 333,909 | A | * | 1/1886 | Willcoxson ................ 280/80.1 |
| 1,241,418 | A | * | 9/1917 | Mosher ................... 280/47.15 |
| 1,793,353 | A | * | 2/1931 | Benson ........................ 280/43 |
| 1,812,827 | A | * | 6/1931 | Gannett ................... 280/47.21 |
| 1,997,428 | A | | 4/1935 | Olson |
| 2,054,572 | A | | 9/1936 | McKenna |
| 3,986,318 | A | * | 10/1976 | McConnell ................ 403/384 |
| 4,126,209 | A | * | 11/1978 | Higgins et al. ............. 187/222 |
| 4,386,792 | A | | 6/1983 | Moore et al. |
| 4,392,390 | A | | 7/1983 | Johnson |
| 4,398,349 | A | | 8/1983 | Bailey |
| 4,642,438 | A | | 2/1987 | Beumer et al. |
| 4,753,425 | A | | 6/1988 | Yang |
| 4,828,240 | A | | 5/1989 | Longenecker et al. |
| 4,838,605 | A | | 6/1989 | Abromavage |
| 4,862,598 | A | | 9/1989 | Barlow et al. |
| 4,881,756 | A | | 11/1989 | Kumasaka et al. |
| 4,886,257 | A | | 12/1989 | Witte |
| 4,901,991 | A | | 2/1990 | Bonkowski |
| 4,955,766 | A | | 9/1990 | Sommerfeld |
| 5,013,017 | A | | 5/1991 | Swann |
| 5,226,638 | A | | 7/1993 | Ausilio |
| 5,288,100 | A | * | 2/1994 | Cherry et al. ............ 280/86.75 |
| 5,415,383 | A | | 5/1995 | Ausilio |
| 5,462,263 | A | | 10/1995 | Feltrin |
| 5,481,811 | A | | 1/1996 | Smith |
| 5,725,247 | A | | 3/1998 | Nilsson et al. |
| 5,746,423 | A | | 5/1998 | Arov |

(Continued)

OTHER PUBLICATIONS

Author unknown, "True Geometry Assurance at Volvo," Quality Today, Jun. 2002, p. 20.

*Primary Examiner*—Ruth Ilan
*Assistant Examiner*—Jordan Golomb
(74) *Attorney, Agent, or Firm*—Young Basile

(57) ABSTRACT

A complete wheel assembly is provided for connecting to a modular base assembly for vehicle modular making. The complete wheel assembly includes a wheel guide assembly fixedly attachable to the modular base assembly and a wheel bracket attachable to a wheel hub and wheel. The wheel bracket provides a quick connection to the wheel guide assembly. The wheel bracket includes adjustable plates to move the wheel horizontally and vertically relative to the modular base assembly for correct positioning of the wheel. The wheel bracket also includes a pin for maintaining the wheel hub and wheel in proper horizontal alignment.

11 Claims, 8 Drawing Sheets

U.S. PATENT DOCUMENTS

| | | |
|---|---|---|
| 5,887,733 A | 3/1999 | Harvey et al. |
| 5,918,868 A | 7/1999 | Bruchman |
| 5,921,535 A | 7/1999 | Lutz, III |
| 6,158,730 A | 12/2000 | Coffey |
| 6,283,538 B1 | 9/2001 | Reitnouer |
| 6,286,823 B1 | 9/2001 | Morghen |
| 6,296,218 B1 * | 10/2001 | Marra .................. 248/297.21 |
| 6,298,572 B1 | 10/2001 | McAuley |
| 6,350,080 B1 | 2/2002 | Do et al. |
| 6,361,035 B1 | 3/2002 | Collins |
| 6,364,302 B2 | 4/2002 | Ausilio |
| 6,439,561 B1 | 8/2002 | Ausilio |
| 6,554,265 B2 | 4/2003 | Andronica |
| 6,681,489 B1 | 1/2004 | Fleming |
| 6,742,808 B1 | 6/2004 | Kosak |
| 7,128,634 B2 * | 10/2006 | Ogihara ...................... 446/456 |
| 7,261,322 B2 | 8/2007 | Ito et al. |
| 7,325,866 B2 | 2/2008 | Horton et al. |
| 7,350,818 B2 | 4/2008 | Rini et al. |
| 7,441,809 B1 | 10/2008 | Coombs et al. |
| 2008/0043386 A1 * | 2/2008 | Atlas et al. .................... 361/33 |
| 2009/0140111 A1 * | 6/2009 | Marino ...................... 248/201 |

* cited by examiner

COMPLETE WHEEL BRACKET ASSEMBLY FOR A MODULAR BASE ASSEMBLY FOR VEHICLE MODEL MAKING

This application claims priority of Provisional Patent Application Ser. No. 60/976,160 filed on Sep. 28, 2007, which is incorporated herein in its entirety by reference.

FIELD OF THE INVENTION

The field of the invention is a complete wheel assembly for a modular base assembly used for vehicle model making.

BACKGROUND

Model making is often used in vehicle industries like the automotive industry. In that industry, designers make full-scale automobile models out of a suitable clay to get a general look and feel of their design before the automobile is produced and sold. Designers also make full-scale, life-like models from a suitable foam for showing off future automobile designs at trade shows. In both cases, a modular base assembly is commonly used as a sort of a pedestal for the models.

In the prior art, wheel assemblies can be fixedly attached to the base assembly. If alignment of the wheel hub and wheel is required, the entire wheel assembly must be disassembled. If this procedure is required for all of the four wheels, then the assembly of the entire modular base assembly for the vehicle model become labor extensive and cost ineffective. Therefore, it is advantageous to have a wheel assembly that can be easily assembled and aligned at a location remote from the modular base assembly. Further, if it is preferred to fine tune any adjustment or alignment of the wheel assembly once the wheel assembly is installed on the modular base assembly, it is advantageous to provide accessible means to the adjustable components of the wheel assembly.

SUMMARY

A complete wheel assembly is disclosed herein for a modular base assembly having a frame formed with a plurality of linearly orientated apertures therethrough wherein the model base assembly is used for vehicle model making. The complete wheel assembly comprises a wheel guide assembly fixedly attachable to the modular base assembly and a wheel bracket assembly fixedly attachable to a wheel hub. The wheel bracket assembly includes an inner platen plate with an arm extending from one surface of the inner platen plate. The wheel guide assembly has a cavity configured for receiving and frictionally holding the arm of the inner platen plate for connecting the wheel bracket assembly to the wheel guide assembly. The wheel bracket assembly further has a mid platen plate and an outer platen plate. The mid platen plate is connected to and horizontally movable relative to the inner platen plate. The mid platen plate is also connected to and vertically movable relative to the outer platen plate. The outer platen plate is fixedly connectable to the wheel hub.

In another aspect of the invention, the complete wheel assembly further includes an adjustment screw secured to the mid platen plate for maintaining the wheel hub in proper alignment.

In another aspect of the invention, the wheel guide assembly has an essentially rectangular configuration but an elongate cavity and access thereto for receiving the arm from the inner platen plate. The wheel guide assembly includes a top guide plate, a bottom guide plate and a pair of side guide plates, the bottom guide plate and pair of side guide plates are welded along peripheral edges. The top guide plate is welded over the pair five guide plates and has a flange extending beyond the peripheral edge of one of the side guide plates. The flange has a plurality of through apertures extending therethrough for receiving bolts for connection to the frame without interfering with the aperture that receives the inner platen arm.

DETAILED DESCRIPTION

Figure 1:
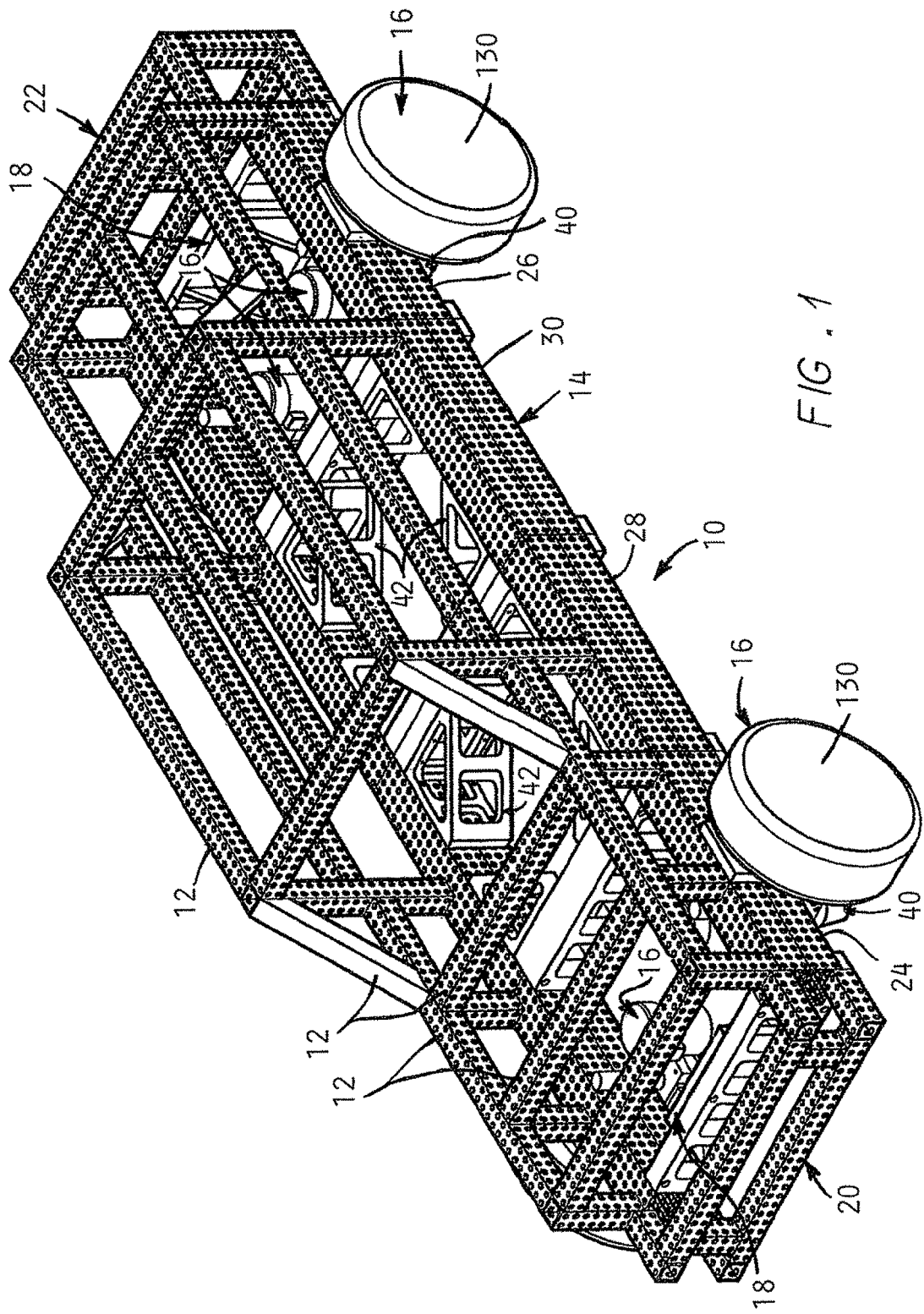
FIG. 1 is a perspective view of a skeleton of an automobile formed from a plurality of model-making components.

A modular base assembly for vehicle model making is shown in FIG. 1. Generally, the modular base assembly will support automobile models weighing about 3,000 to 4,000 pounds, and is made to support up to 10,000 pounds. The base assembly 10 has numerous model making components 12 attached together that form the skeleton of an automobile. The components 12 can be configured to skeleton different sized automobiles. The base assembly further has a frame 14, four leveler assemblies 16 attached around the frame, a pair of couplers/bulkheads 18 attached on opposite ends of the frames 14. The leveler assembly 16 is made of several parts including a base that carries a jack assembly and also carries a complete wheel assembly with a hub.

The frame 14 generally has rectangular shape forming the base for the vehicle. The rectangular shape is derived from four frame segments that are attached end to end and includes a front frame segment 24, a rear frame segment 26 and two intermediate frame segments 28, 30 that are bolted together. The frame segments allow the user to disassemble and reassemble the base assemblies in manageable parts for handling. The leveler assemblies 16 include the complete wheel assemblies 40 and separate leveler components. The modular base assembly and the leveler components were previously discussed in Ser. No. 11/334,035 filed on Jan. 18, 2006 incorporated herein by reference in its entirety. An improved complete wheel assembly 40 is now discussed hereinafter.

Figure 2:
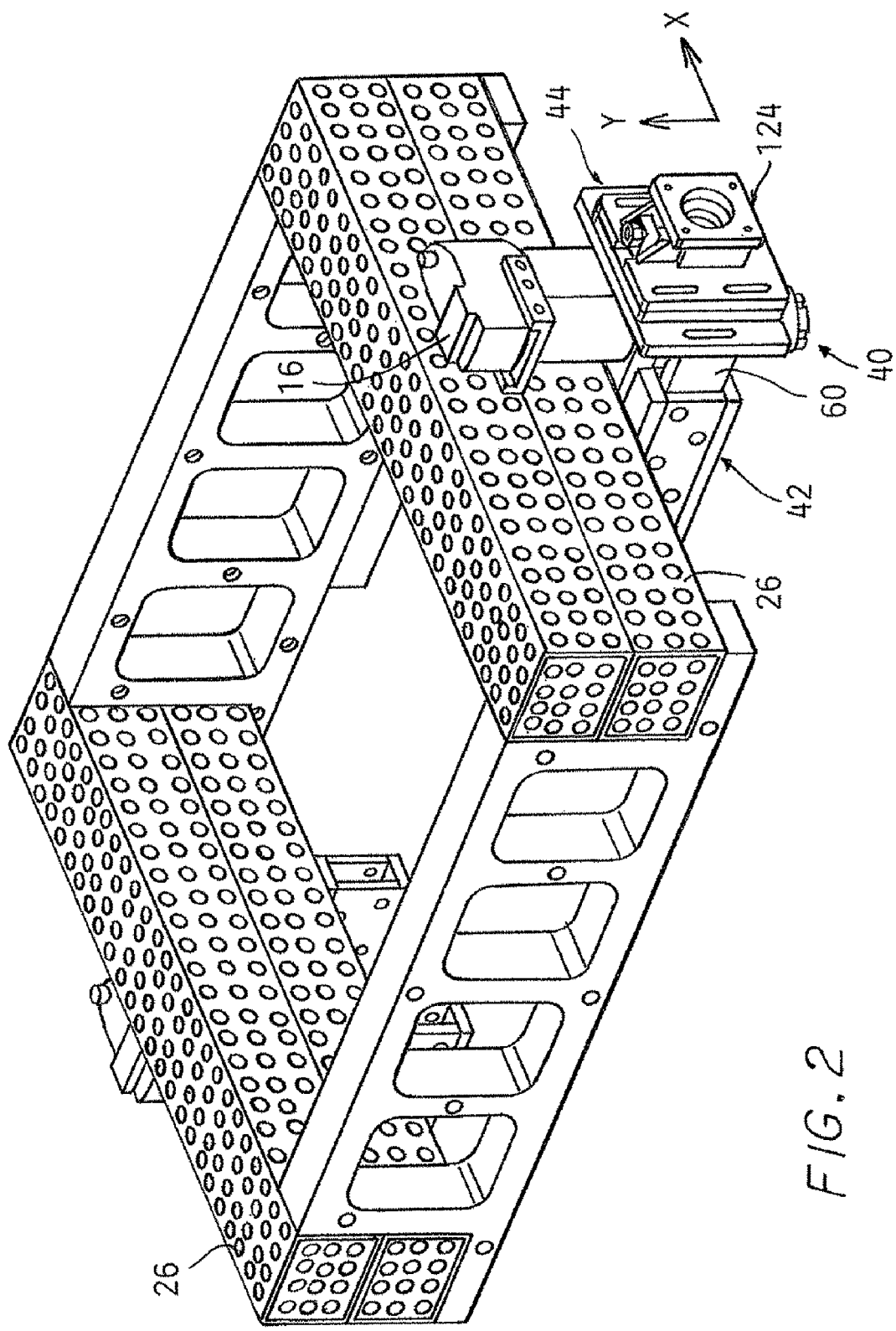
FIG. 2 is a perspective view of a rear section of the skeleton illustrating a complete wheel assembly for a wheel according to the present invention.
Figure 3:
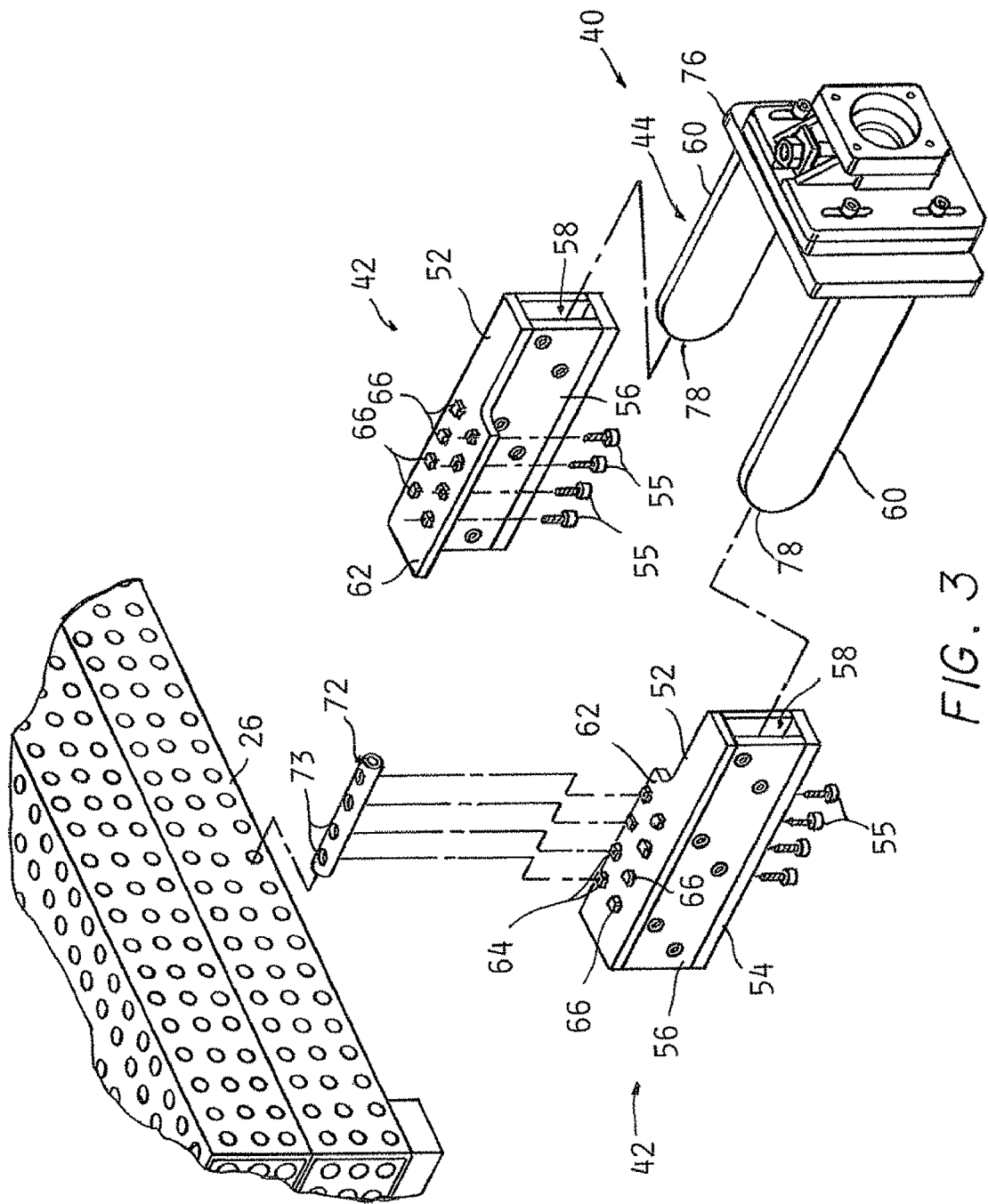
FIG. 3 is an exploded view of the wheel guide assembly and wheel bracket assembly for connection to a modular base assembly.
Figure 4:
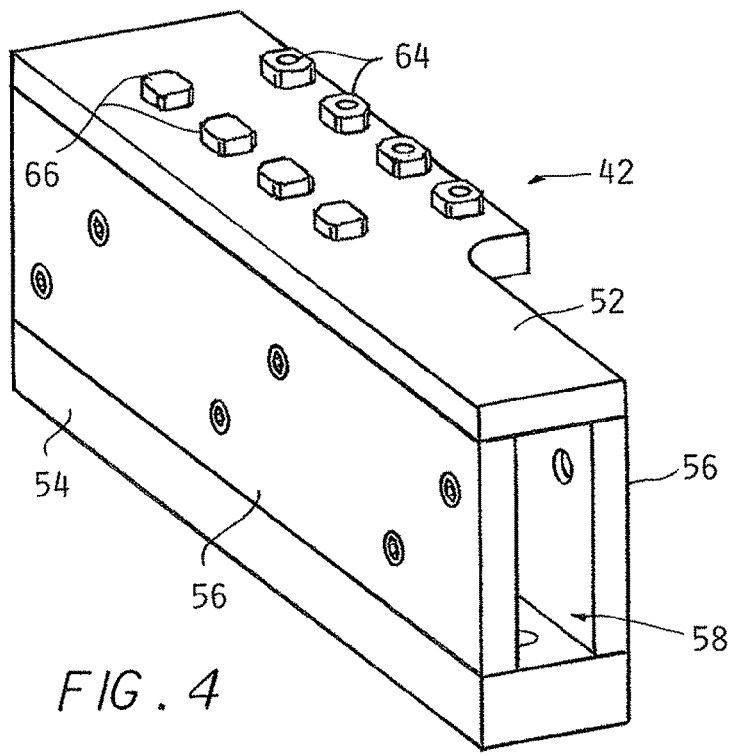
FIG. 4 is a perspective view of a wheel guide assembly for the complete wheel assembly.

Looking at FIGS. 2-12, the complete wheel assembly 40 is configured for bolting to the front and rear frame segment 24, 26. Although the complete wheel assembly 40 can be connected on both sides of the front and rear frames 24, 26, only the connection to rear frame 26 will be discussed. The connection to the other three positions will be the same as the connection to the left rear frame 26. The complete wheel assembly 40 includes a pair of wheel guide assemblies 42 and a wheel bracket assembly 44. FIGS. 2 and 3 illustrate the left wheel guide assembly 42 in which the right wheel guild assembly is a mirror image. The wheel guide assembly 42 includes a wheel guide top 52, a wheel guide bottom 54 and a pair of wheel guide sides 56. The wheel guide sides 56 and bottom 54 are welded together along their peripheral edges to the wheel guide top 52 forming a through aperture 58 therebetween. The aperture 58 is sized for receiving the wheel bracket inner platen 60 as will be discussed hereinafter. The wheel guide top 52 has a flange 62 extended beyond one longitudinal edge. The flange 62 has a plurality of through apertures extending through raised nubs 64 for providing access to bolt the wheel guide assembly 42 to the rear section 26 without interfering with the aperture 58 for the inner platen arms 60. The apertures through the raised nubs 64 are linearly aligned and spaced for disposition to corresponding underside holes of the rear section 26. The apertures 64 received bolts 55. Adjacent the aperture 64 may be closed raised nubs 66 parallel to the aperture 64. The closed nubs 66 facilitate the correct orientation of the wheel guide assembly 42 relative to the rear section 26.

A nut strip 72 may be provided for disposition within the front or rear section 26 into which the bolts 55 are further secured thereto. The nut strip 72 can have various lengths. However, the apertures 73 through the nut strip 72 should coincide with the number of apertures 64 in the wheel guide assembly.

The bottom wheel guide 54 includes a plurality of spaced linearly aligned through apertures 68. The apertures 68 provide an access for a Viler ball plunger 69 that acts as a positive stop to frictionally secure against the inner platen arms 60 after the inner platen arms 60 are positioned within apertures 58. Each of the side wheel guides 56 have through apertures 70 aligned with each other to provide proper lateral alignment of the inner platen arms 60 in the apertures 58 and prevent the wheel bracket assembly from inadvertently dislodging from the wheel guide assembly 42.

Figure 6:
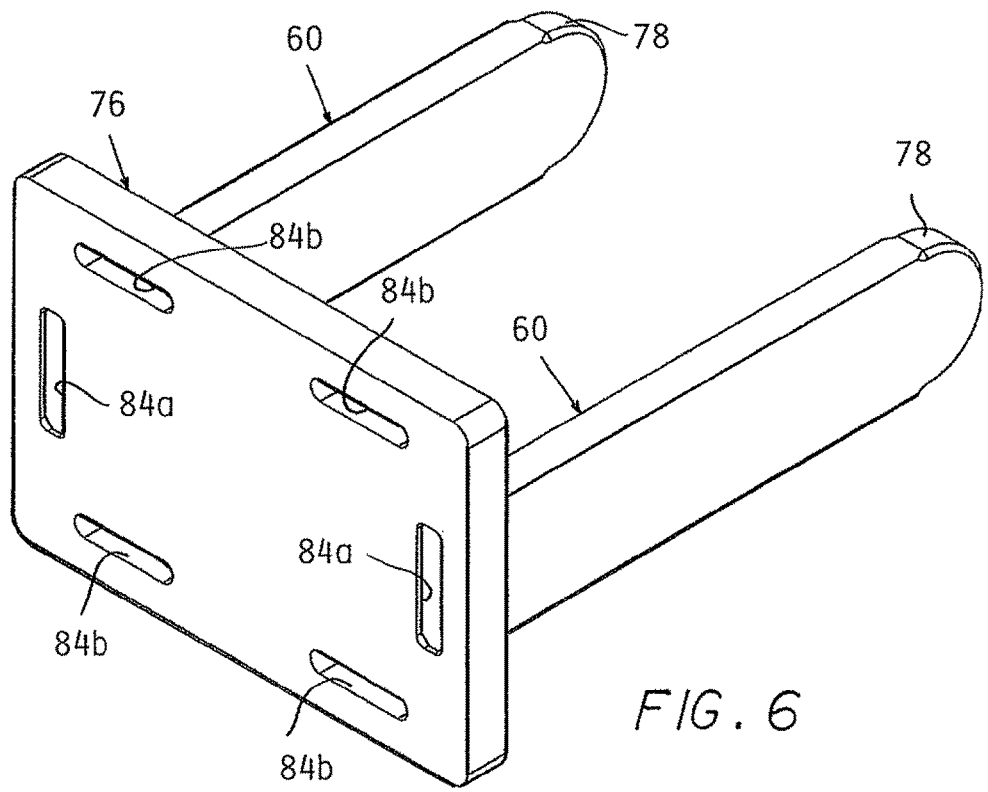
FIG. 6 is a perspective view of an inner platen assembly for the wheel bracket complete assembly.
Figure 7:
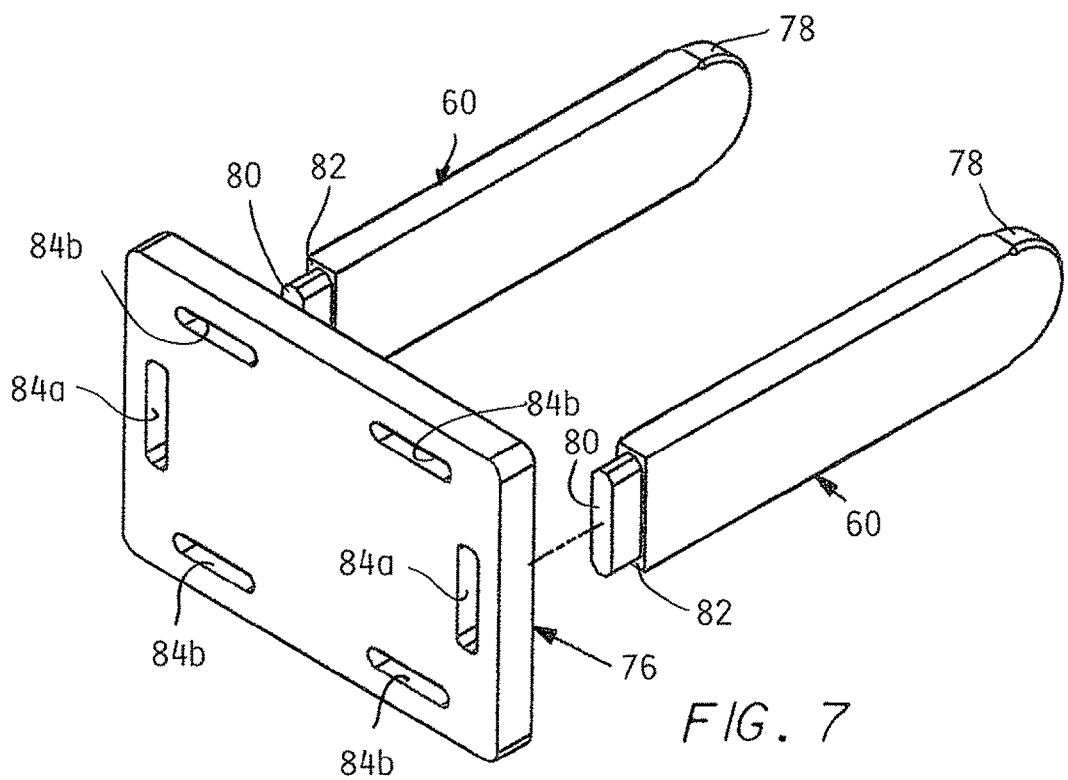
FIG. 7 is an exploded view of the inner platen assembly shown in FIG. 6.

Looking at FIGS. 6 and 7, the wheel bracket assembly 44 is connected to the frame 26 via the pair of wheel inner platen arms 60 disposed in apertures 58. The inner platen arms 60 are connected to an inner platen plate 76 which comprises a portion of the wheel bracket assembly. The inner platen arms 60 have first ends 78 with an arcuate configuration so that sharp corners do not catch onto the wheel guide during insertion into the apertures 58. The opposing ends have flanges 80 centrally disposed on a rear face 82 of the opposing end.

The inner platen plate 76 of the wheel bracket assembly 44 is rectangular and has parallel opposing planar surfaces. The inner platen plate 76 has a plurality of through slotted apertures 84 a, b extending through to the opposing planar surfaces. The vertical slotted apertures 84 a, are aligned to have an opposing aperture near the opposing peripheral edge of the inner platen plate 76. This arrangement provides a symmetrical plate configuration. The apertures 84a are configured for receiving the flanges 80. The flanges 80 of the inner platen arms 60 are welded within apertures 84a. The horizontally orientated apertures 84b receive bolts for the wheel bracket assembly 44. The slotted apertures 84b allow the inner platen plate 76 to be aligned and moved in a fore and aft direction (x direction) toward the front or back of the vehicle frame structure.

Figure 8:
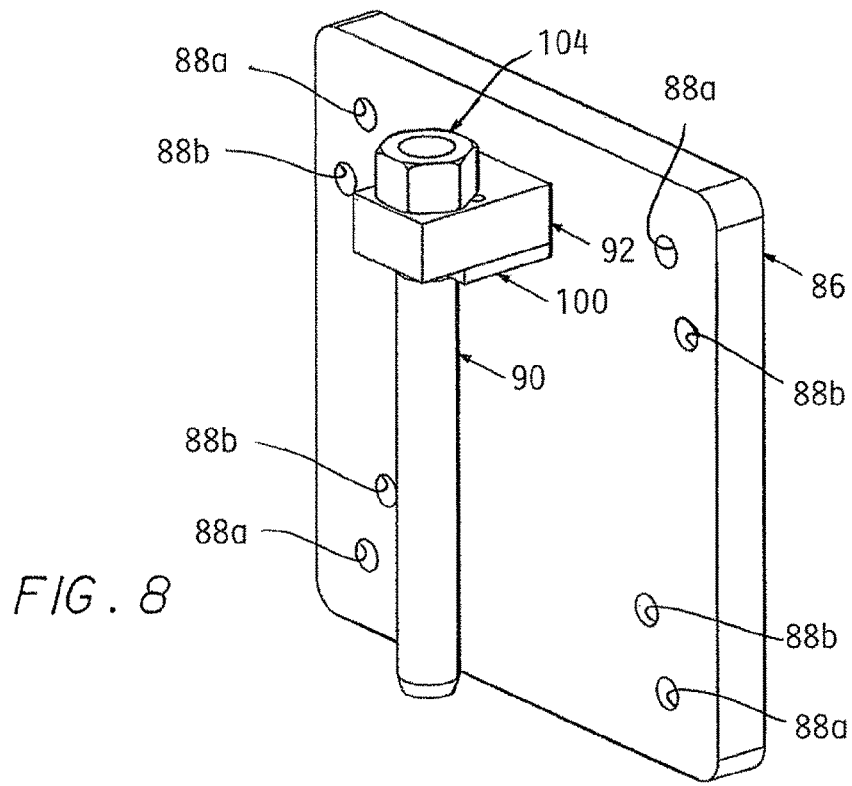
FIG. 8 is a perspective view of a mid-platen assembly for the wheel bracket assembly.
Figure 9:
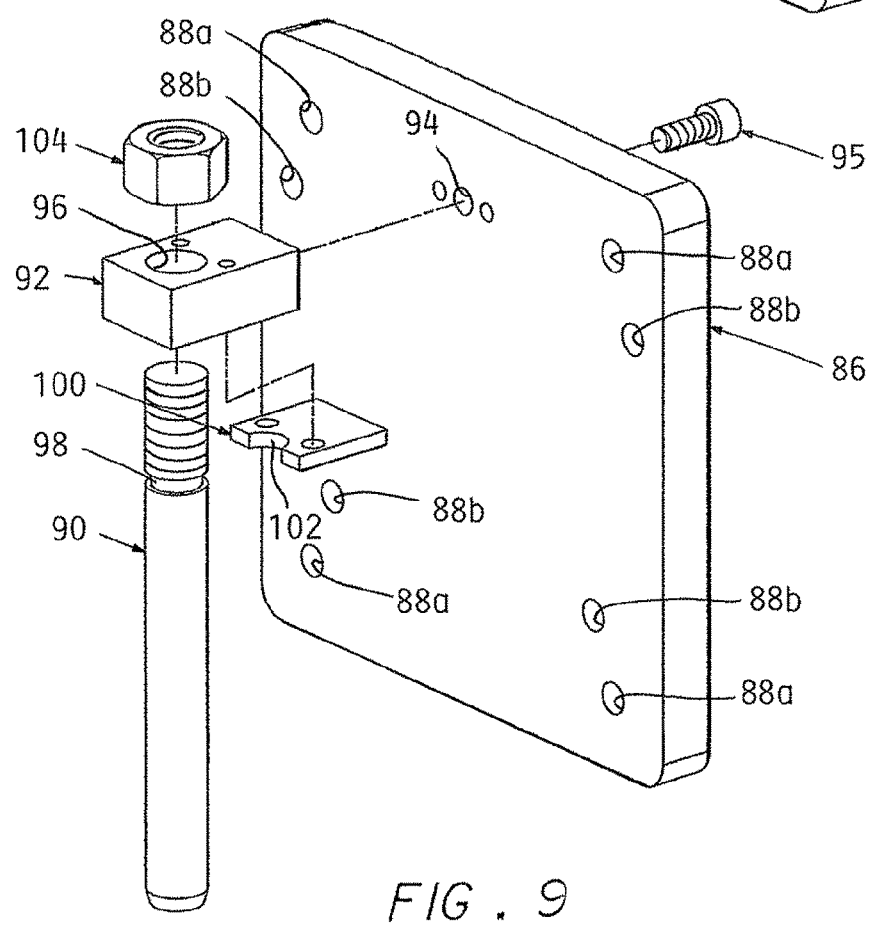
FIG. 9 is an exploded view of the mid-platen assembly shown in FIG. 8.
Figure 12:
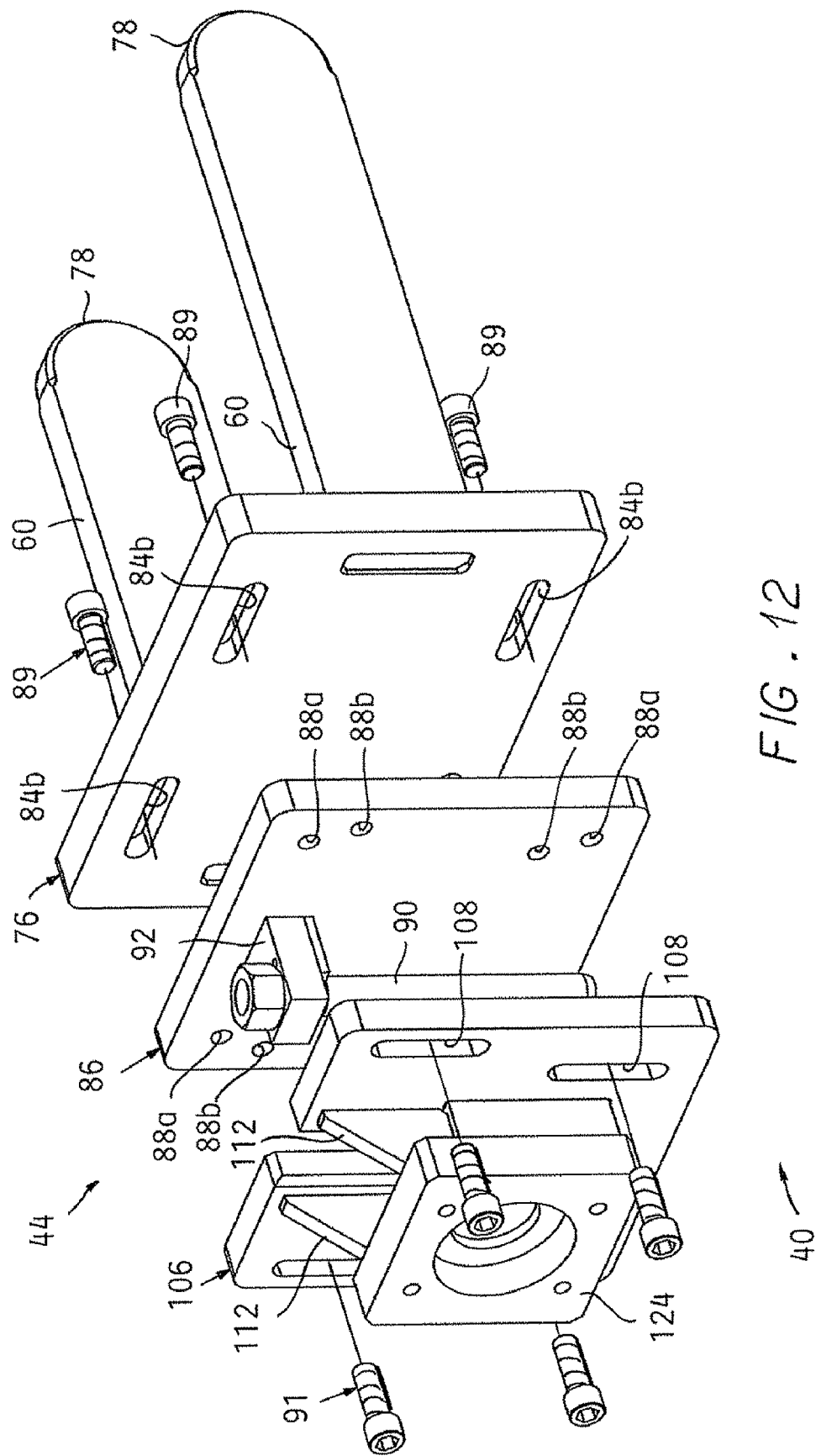
FIG. 12 is an exploded view of the wheel bracket assembly.

Looking at FIGS. 8, 9 and 12, the mid platen plate 86 is rectangular with planar opposing sides and having through apertures 88 a,b positioned adjacent each corner of the plate 86. The apertures 88a are positioned for receiving a bolt 89 extending through the inner platen plate 76 via through apertures 84b. The apertures 88b are positioned for receiving the bolt 91 extending through the outer platen plate 106 via through apertures 108 which will be discussed further. The mid platen plate 86 can move laterally relative to the inner platen plate 76. The mid platen plate 86 further includes means for connection to a mid platen adjustment screw 90. The adjustment screw 90 is held or secured to the mid platen plate 86 by means of a bracket 92 threadably screwed to the center apertures 94 in the mid platen plate 86. The adjustment screw 90 is sized for fitting through a through aperture 96 in the bracket 92. The adjustment screw 90 has a reduced neck portion 98 near the top end of the adjustment screw 90. A keeper plate 100 has an arcuate aperture/notch 102 sized for slipping around the neck 98. Therefore, the radius of the arcuate aperture 102 is smaller than the radius of the through aperture 96 in the bracket 92, The keeper plate 100 and bracket 92 are secured together via conventional threading means. The keeper plate 100 prevents vertical movement of the screw 90 relative to the bracket 92. A conventional nut 104 is secured to the top of the screw 90. The adjustment screw 90 has a length such that it extends to the bottom surface of the mid platen plate when installed thereon. The screw 90 maintains a wheel hub 124 in proper horizontal alignment.

Figure 10:
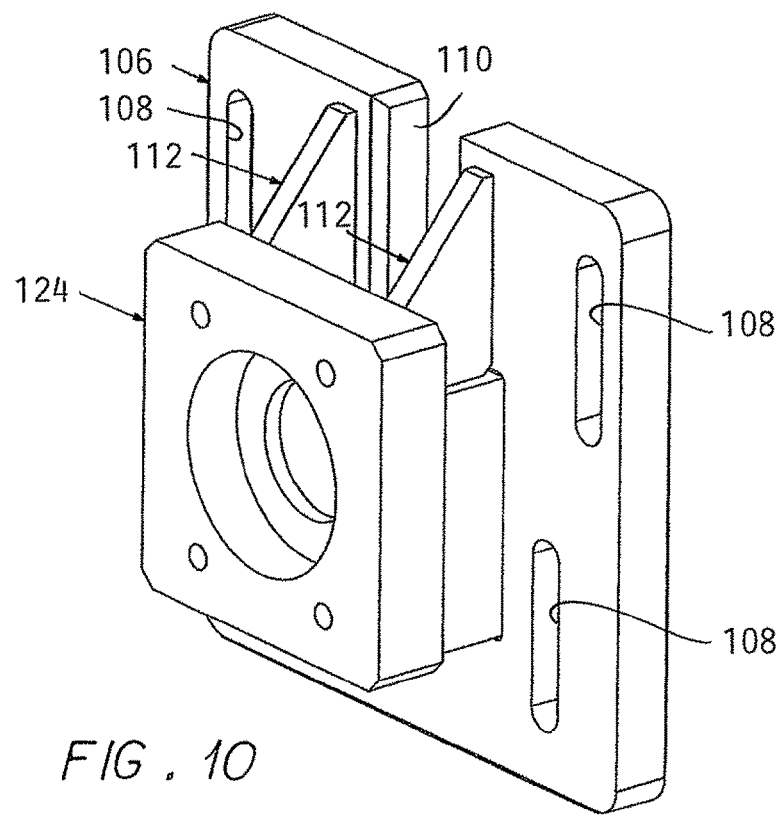
FIG. 10 is a perspective view of an outer platen assembly for the wheel bracket assembly.
Figure 11:
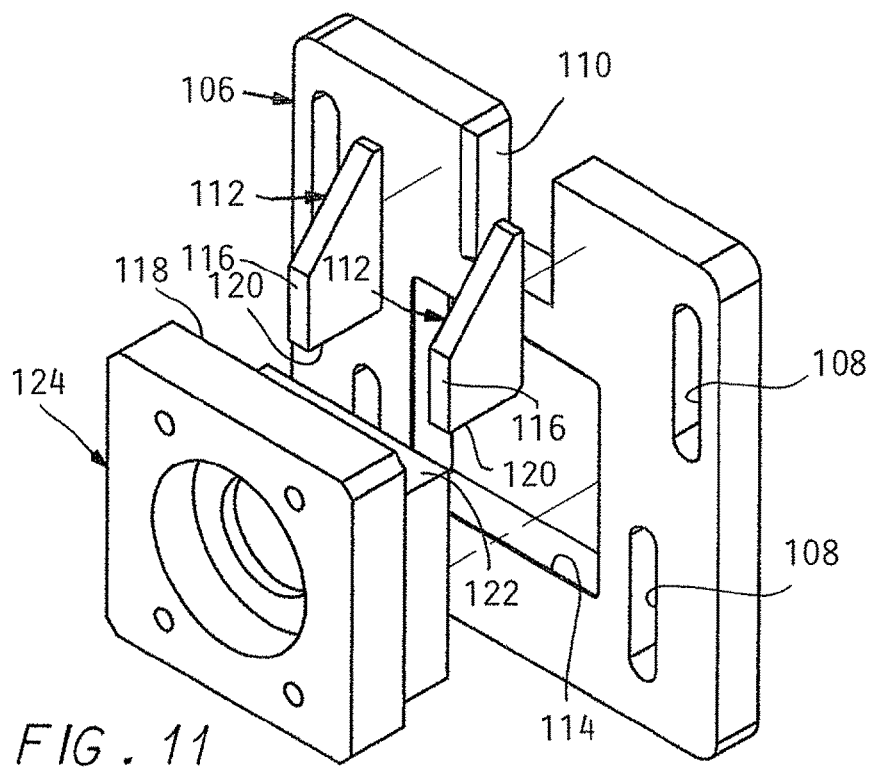
FIG. 11 is an exploded view of the outer platen assembly shown in FIG. 10.

Looking at FIGS. 10 and 11, the wheel bracket assembly 44 further includes an outer plate assembly having a rectangular outer plate 106. The outer plate 106 has vertically orientated slots 108. The slotted apertures 108 allow relative vertical movement of the outer plate 106 relative to the wheel guide assembly 42. The outer plate 106 further has a central slot 110 opened to the upper peripheral edge. The upper slot 110 accommodates the position of the mid platen bracket 92 and nut 104 and the adjustment screw 90 on the mid platen plate 86. A pair of angle brackets 112 are welded along each vertical edge of the upper slot 110. The angle brackets 112 enclose around the mid platen bracket 92 and keeper plate 100, as well as the adjustment screw 90 as shown in FIG. 3. The forward surfaces 116 of the angle brackets are welded to the back plate surface 118 of the hub mount 124. The bottom surfaces 120 of the angle brackets 112 are welded to rest on the upper ledge 122 of the hub mount 124. A center aperture 114 is positioned below the upper slot 1.10. The center aperture 114 is positioned for welding the back surface 118 of a conventional hub mount 124 therein.

Figure 5:
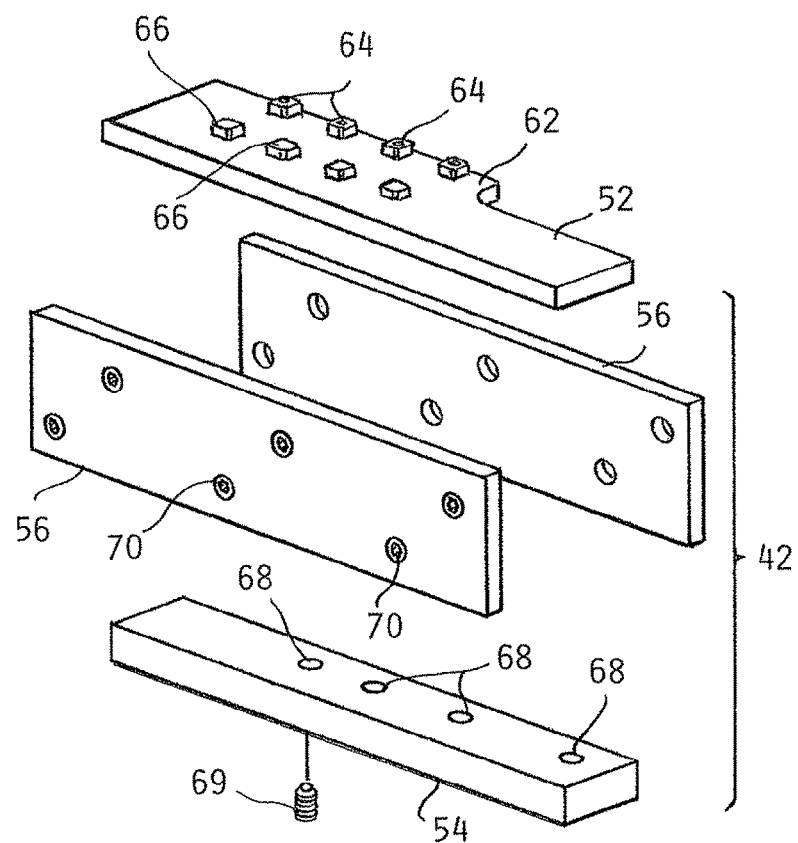
FIG. 5 is an exploded view of the wheel guide assembly shown in FIG. 4.

The complete wheel assembly 40 is assembled to the modular base assembly 26 by first assembling the wheel bracket assembly 44 as disclosed supra. The wheel guide assembly 42 is assembled onto the base assembly 26. The inner platen arms 60 are inserted into the apertures 58 of the wheel guide assembly 42. The Viler plunger 69 is installed into the apertures 68 of the wheel guide bottom 54 with set screws (not shown) to frictionally maintain the arms 60 in position within the apertures 58 and to prevent the wheel bracket assembly 44 from disengaging from the wheel guide assembly 42. Although only one Vlier plunger 69 is shown in FIG. 5, it is envisioned that each aperture 68 will have a Vlier ball plunger 69 disposed therein.

Adjustments can be made to the wheel bracket assembly 44 with the slotted apertures 84b allowing for horizontal (x direction) adjustment of the wheel bracket assembly 44 and slotted apertures 108 allowing for vertical (y direction) adjustment of the wheel bracket assembly 44. Once the complete wheel assembly 40 is correctly positioned, a wheel 130 can be installed on the hub mount 124. If additional adjustment is required after the wheel bracket assembly 44 is installed on the wheel guide assembly 42, the slotted apertures 84b and 108 of the inner and outer platen plates, respectively, are visible with their associated connections to the mid platen plate 86. Therefore, easy access is provided for adjustment to the wheel assembly 40.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A complete wheel assembly for receiving a wheel hub for a modular base assembly having a frame formed with a plurality of linearly orientated apertures therethrough, said model base assembly used for vehicle model making, the complete wheel assembly comprising:
a wheel guide assembly fixedly attachable to the modular base assembly; and a wheel bracket assembly fixedly attachable to a wheel hub, said wheel bracket assembly having an inner platen plate with an arm extending from one surface of the inner platen plate and said wheel guide assembly having a cavity configured to slidably receive and frictionally hold the arm for connecting the wheel bracket assembly to the wheel guide assembly, said wheel bracket assembly further having a mid platen plate and an outer platen plate, said mid platen plate connected to and horizontally movable relative to the inner platen plate, and the mid platen plate connected to and vertically movable relative to the outer platen plate, wherein said outer platen plate is fixedly connectable to the wheel hub.

2. The complete wheel assembly of claim 1 further comprising an adjustment screw secured to the mid platen plate for maintaining the wheel hub in proper alignment, said adjustment screw having a predetermined radius and a portion of the adjustment screw having a smaller radius than the predetermined radius.

3. The complete wheel assembly of claim 2 wherein the mid platen plate includes a bracket screwed to a flat surface of the mid platen plate, said bracket having a through aperture for receiving a portion of the adjustment screw and a keeper plate secured to a horizontal surface of the bracket, said keeper plate having an arcuate notch formed along one peripheral edge, said notch having a radius corresponding to the smaller radius of the portion of the adjustment screw.

4. The complete wheel assembly of claim 3, wherein the adjustment screw when assembled to the mid platen plate extends to a lower edge of the mid platen plate to facilitate the horizontal alignment of the wheel hub.

5. The complete wheel assembly of claim 3, wherein the outer platen plate has a center aperture for receiving a portion of the wheel hub, an upper notch cut into an upper peripheral edge of the outer platen plate for receiving a portion of the bracket for the adjustment screw and a plurality of elongated through apertures orientated in a vertical direction when assembled to the modular base assembly, wherein the outer platen plate is connected to the mid platen plate by bolts disposed in the plurality of elongated through apertures of the outer platen plate and secured in apertures in the mid platen plate.

6. The complete wheel assembly of claim 5, wherein the outer platen plate has a pair of angle brackets welded adjacent vertical edges of the upper notch to properly space the wheel hub from the mid platen plate when assembled.

7. The complete wheel assembly of claim 3, wherein the inner platen plate has a plurality of elongated through apertures orientated in a horizontal direction when assembled to the modular base assembly, wherein the inner platen plate is connected to the mid platen plate by bolts disposed in the plurality of elongated through apertures of the inner platen plate and secured in apertures in the mid platen plate.

8. The complete wheel assembly of claim 3, wherein the wheel guide assembly has an essentially rectangular configuration with an elongate cavity and access thereto for receiving the arm from the inner platen plate, said wheel guide assembly including a top guide plate, a bottom guide plate and a pair of side guide plates, the bottom guide plate and pair of side guide plates are welded together along the peripheral edge.

9. The complete wheel assembly of claim 8, wherein the top guide plate is a flange extending beyond the peripheral edge of one of the side guide plates, said flange having a plurality of through apertures extending therethrough for receiving bolts for connection to the frame.

10. The complete wheel assembly of claim 9, wherein the bottom guide plate includes a plurality of linearly aligned through apertures, and having a Vlier ball plunger disposed of at least one of the plurality of linearly aligned through apertures positioned for contact with the arm.

11. The complete wheel assembly of claim 10, wherein a free end of the arm has an arcuate formation.

\* \* \* \* \*